Oct. 15, 1968  H. BEISSWENGER ET AL  3,406,094
PROCESS AND DEVICE FOR THE DISCHARGE OF FISSION GASES
FROM NUCLEAR FUEL ELEMENTS
Filed June 3, 1965  5 Sheets-Sheet 1
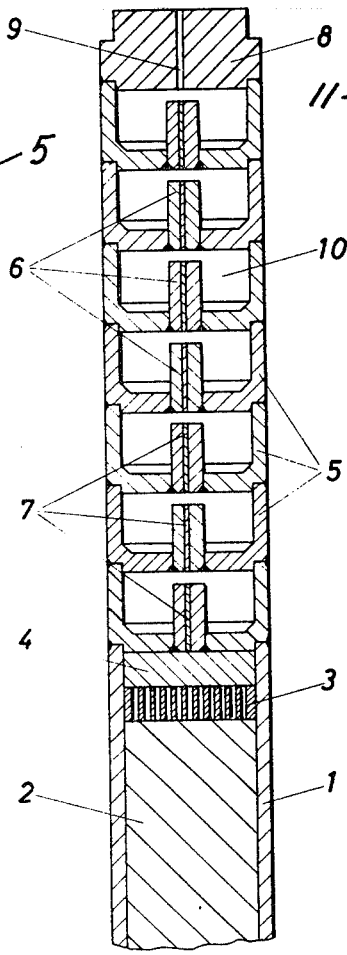
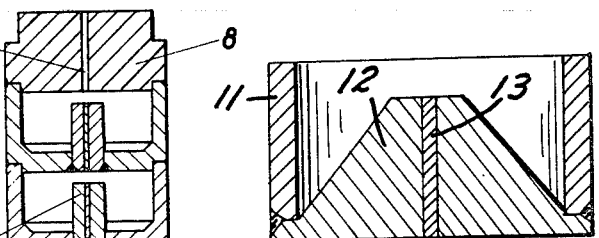
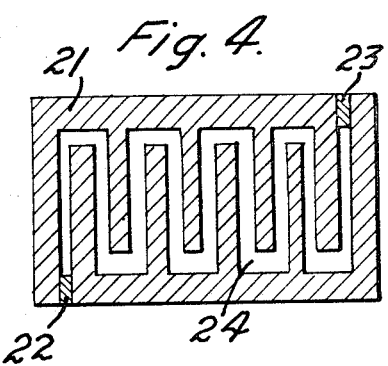
Inventors
Heinrich Beisswenger
Bernhard De Temple
by Michael J. Striker
Atty

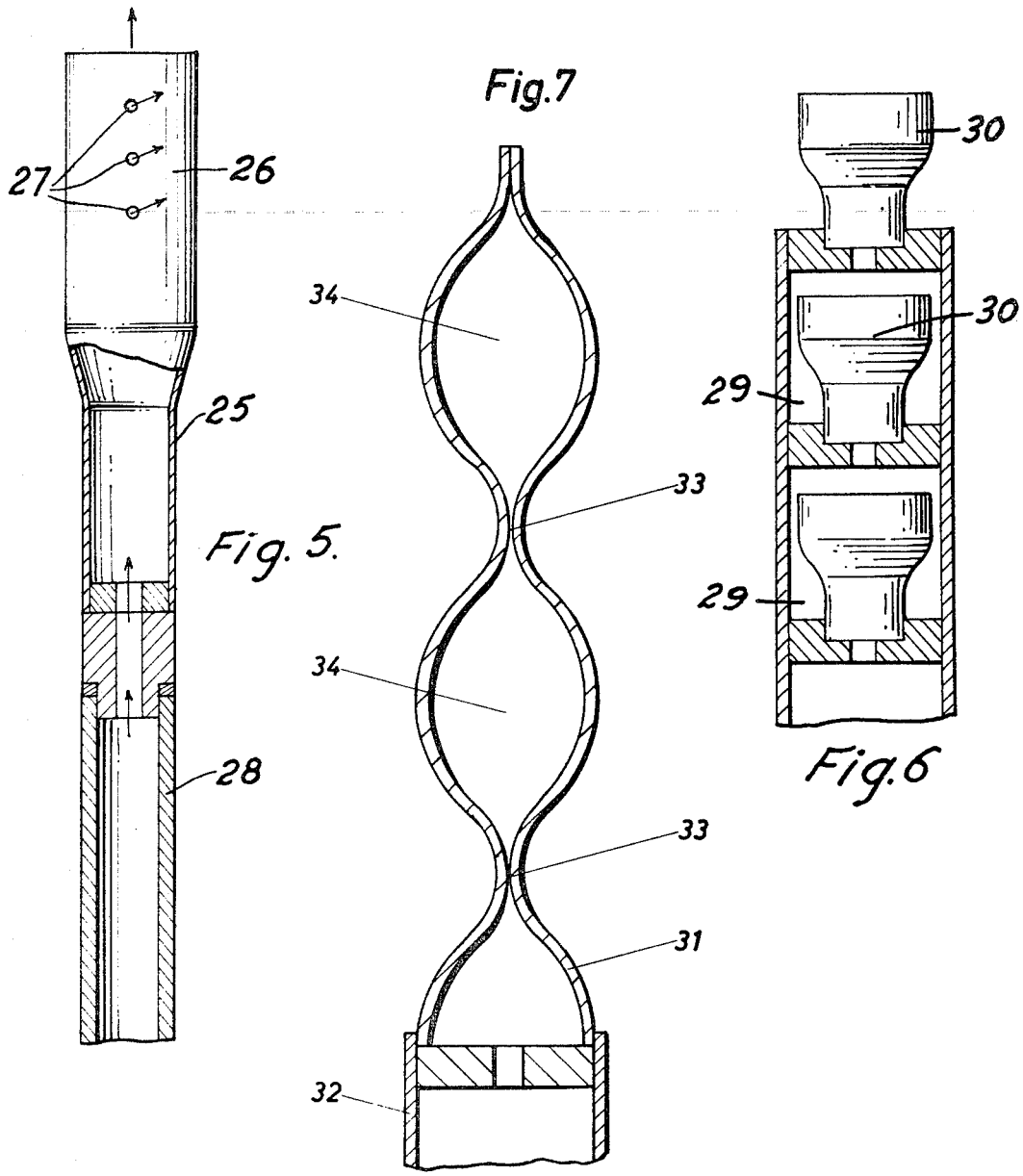

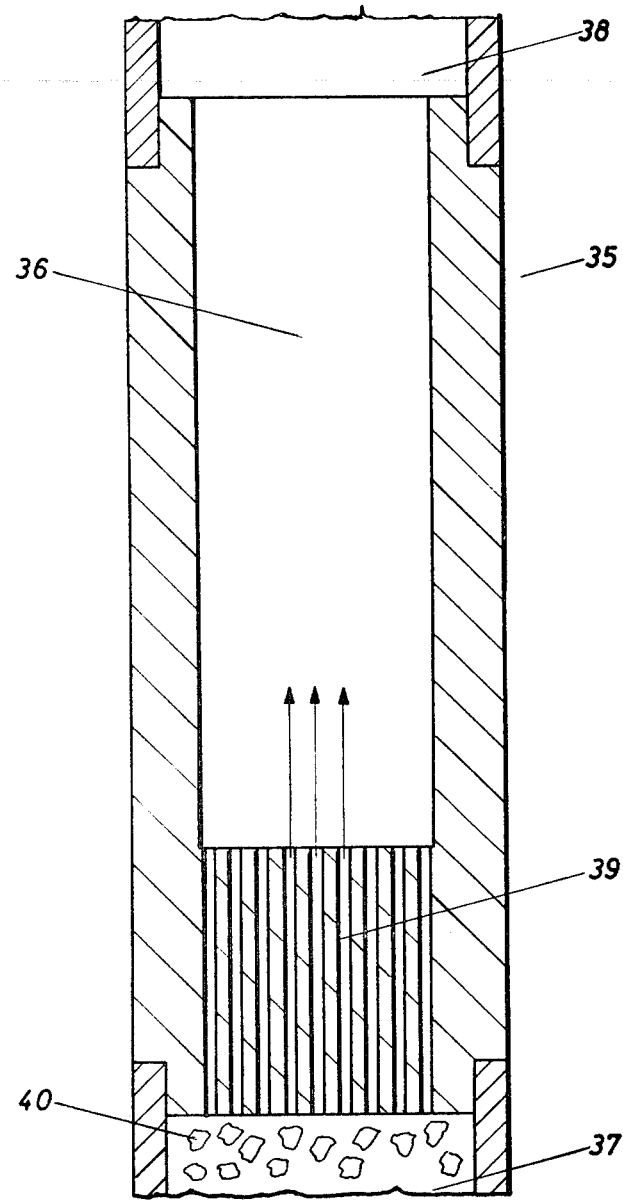

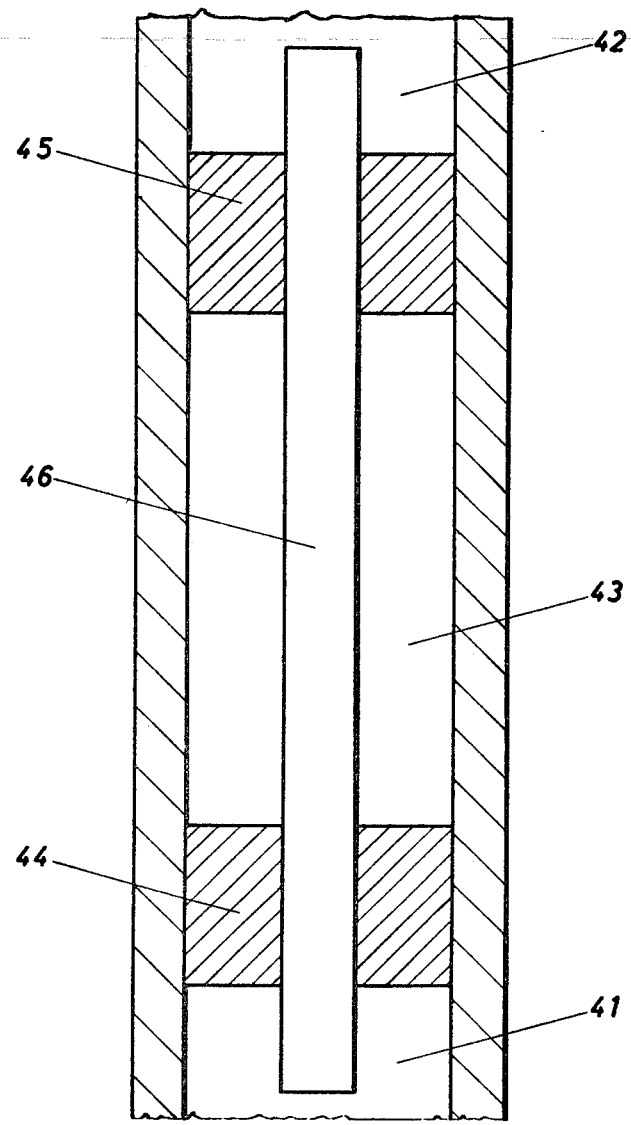

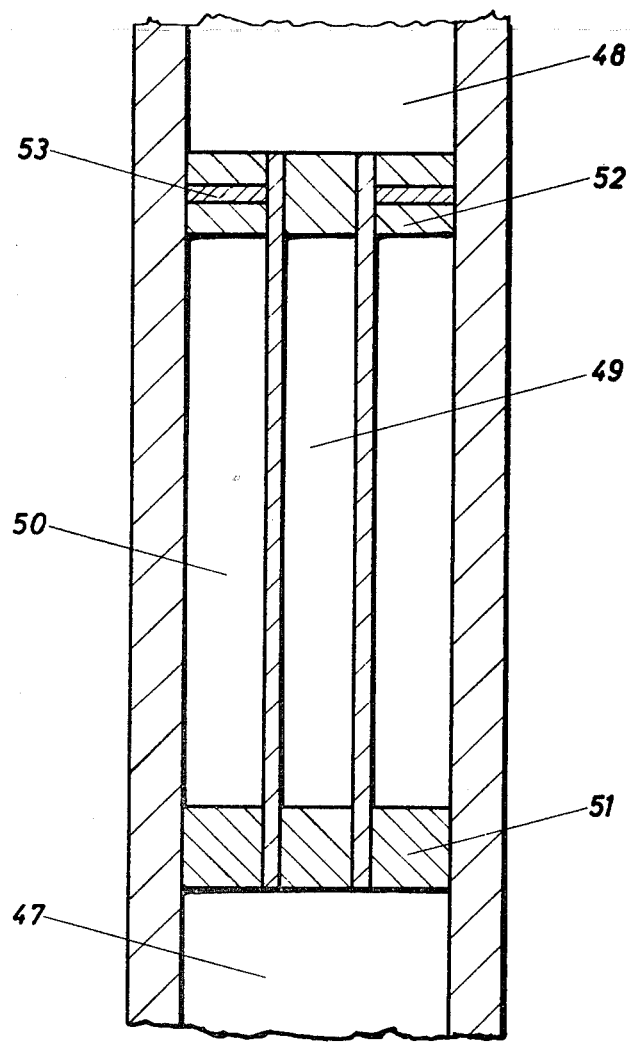

3,406,094
PROCESS AND DEVICE FOR THE DISCHARGE OF FISSION GASES FROM NUCLEAR FUEL ELEMENTS

Heinrich Beisswenger, Friedlandstrasse 3, and Bernhard de Temple, Schneidemuhlerstr. 12H, both of Karlsruhe, Germany
Filed June 3, 1965, Ser. No. 461,146
Claims priority, application Germany, June 3, 1964, G 40,743; Dec. 31, 1964, G 42,445; Mar. 26, 1965, G 43,187
27 Claims. (Cl. 176—79)

The invention relates to a process and a device for the discharge of fission gases from nuclear fuel elements into the surrounding atmosphere, in particular into the cooling cycle of the nuclear reactor.

The life of fuel elements employed in nuclear reactor engineering, especially that of ceramic fuel elements, e.g. of uranium dioxide or mixtures of uranium dioxide and plutonium oxide, is largely limited by the generation of fission gases. The gaseous fission products generated during nuclear fission built up in the interior of the fuel element and gradually generate a high pressure within the fuel element. The higher the temperature of the fuel elements is, the higher the pressure will be, especially in ceramic fuel elements used for high-temperature reactors. During operation the pressure increases to such an extent as to cause swelling and rupture of the fuel can which surrounds the fuel and is intended to prevent a contact between fuel and coolant and consequent leakage of highly radioactive material into the cooling cycle, thus rendering the fuel element useless.

Several possibilities have already been devised for binding or removing the arising fission gases. For instance, the fission gases may be taken up in the atomic lattice in ceramic fuels sintered in an appropriate way. However, this method is not effective for the desired high burnup rates and at fuel temperatures in excess of 1,500° C. It has been suggested therefore to provide rod-type fuel elements with a suction device installed at the rod end. Such a device requires a corresponding suction system in addition to the fuel element system, which will be complicated and constitute an obstacle in fuel element changes.

By the process of the invention it is possible to avoid this complicated system and yet remove the fission gases from the fuel element so as to overcome limiting of the life of the fuel elements resulting from the buildup of fission gas pressure. Due to its high radioactivity and because of the contamination resulting from byproducts the fission gas cannot be released directly into the cooling cycle; rather, it should be stored over a lengthy period of time to allow its radioactivity to decay to a sufficient level. The preferable storage time is some 60 days. After this time the activity, e.g. of all xenon isotopes, has decayed to a sufficiently low level, and the other important material, krypton-85 which is produced in nuclear fission at a rate of some 0.29 percent and has a half-life of 10.2 years, may be directly discharged into the outside atmosphere because of this low percentage. Thus, after some 60 days of storage the total radioactivity of the fission gases has decreased to such a level as to permit the discharge of these gases into the coolant of the nuclear reactor.

Thus, in the invention the fission gases are directly removed by a discharging device in which the flow of the fission gases is delayed by means of throttle elements installed in the discharge device to average periods of several days, preferably 60 days. In particular, it is possible by the process according to the invention to release the fission gases into the coolant of the nuclear reactor. This is done by constructing the discharge device in form of one chamber equipped with means for throttling the gas flow. Advantageously, several such chambers are arranged in series at one end of the fuel element, each of them being equipped with devices for throttling the gas flow and connected with each other either directly or by common wall portions permeable to gas. The wall portions permeable to gas are preferably made of a porous material having the correct high flow or diffusion resistance, respectively, for the fission gases. The series arrangement of several chambers has the advantage of preventing any mixing of fresh fission gas and fission gas whose radioactivity is decayed. Labyrinth systems installed in the chambers and conducting the gas flow prevent mixing of the gas freshly entering the chamber and the gas which has already been in the chamber for some time.

An absorption filter is installed within the fuel element in front of the outlet opening in order to prevent the discharge of volatile, condensable fission products, e.g., bromine, iodine, rubidium, and cesium, as well as clogging of the throttle devices by these materials. In addition, some of the chambers may be filled with the proper type of absorptive charge absorbing the volatile fission products or binding them chemically; they may also be filled with charges increasing the throttling action. One particular advantage of the series arrangement lies in the fact that in case of leaking passages between the individual chambers the rest of the undamaged passages prevent fresh fission gas, i.e. fission gas whose radioactivity has not yet decayed, from entering the cooling cycle of the reactor.

The portions of the wall between the chambers which are permeable to gas may be designed as channels filled with a powder, e.g. of $Al_2O_3$, MgO, iron, nickel compacted so as to offer a high flow resistance to the gas. Moreover, it may be an advantage to sinter the compacted powder in order to obtain sufficient stability of the channel filling. The compaction of the powder may be carried out in a well-known way by reducing the diameter of the tube filled with powder by swaging, drawing or rolling. In the final rod the outside diameter of these tubular connecting channels should be 1–2 mm., the diameter of the powder filling, e.g. some tenth of a millimeter in one particular example. The desired flow resistance may be reached by varying the grain size of the powder or the length and diameter of the powder filling. Moreover, a rotational symmetrical body may be equipped with a central bore which is filled with powder, the whole body then being put under pressure in a press to compact the powder filling. For instance, it is a particular advantage to use a conical body with the bore introduced along the axis of the cone. This body is used as a separating body between the individual chambers. The channels between the chambers may also be made so fine, e.g. by drilling with an electronic beam, as to possess a sufficiently high flow resistance without being filled with a charge.

The process according to the invention may be employed for all types of cooling, especially in the case of liquid-metal cooling and gas or steam cooling. However, to prevent coolant from being introduced by leakage it is useful to fill the fuel elements with a protective gas before insertion into the reactor; the pressure of the protective gas should be higher than the coolant pressure to be expected.

In this way, it is possible to avoid a complicated system of tubes and seals for the removal of fission gas. On the contrary, only little space is needed for a slight extension of the fuel element by the system of chambers and no special detachable seals are employed. Moreover, fuel element fabrication is not influenced in a negative way when using the new device, because the system of chambers is prefabricated, installed on the fabricated fuel element and may then be welded on like an end plug.

Details of the invention are explained more closely on the basis of FIGS. 1–4:

A device according to the invention is shown in FIG. 1, where a metal tube 1 filled with nuclear fissile or fertile material 2 is connected at its upper end through a sievelike metal disk 3 and a porous filter 4 for the absorption of volatile fission products to an arrangement consisting of fission gas chamber elements 5. These elements contain circular web 6 equipped with channels of high flow resistance 7. The last fission gas chamber element is connected to the outside chamber by a sealing plug 8 having an outlet channel 9. The fission gases released to the outside collect in the chambers 10 formed by the chamber elements.

FIGS. 2 and 3 show two different constructions of the chamber elements. In FIG. 2 the chamber element 5 consists of a tubular body with a flat bottom into which a circular web is welded, containing a channel 7 filled with a compacted and sintered powder, e.g. aluminum oxide or magnesium oxide. In FIG. 3 the chamber element consists of a tube length 11 to which a conical body 12 is joined by welding, and which has a channel 13 corresponding to the channel shown in FIG. 2.

One advantageous way of constructing the chamber elements is shown in FIG. 4. Here, a system of labyrinths 24 is arranged in the chamber element 21 between gas inlet channel 22 and gas outlet channel 23 filled with compacted and sintered powder, so as to avoid mixing of the gases flowing into the chamber with the gas flowing out of the chamber.

One particularly advantageous device for the execution of the process under the invention has relief pressure valves installed as throttles in the discharging device. The discharging device may have several chambers separated from each other by relief pressure valves. The opening pressure of the individual relief pressure valves is preferably equal. The sum of the opening pressures of all relief pressure valves installed at one fuel element, however, does not exceed the maximum permissible fission gas pressure in the fuel element. On the other hand, the relief pressure valves are not supposed to open too early before the maximum permissible pressure is reached. In this way it is assured that the radioactive fission gases are retained in the fuel element as long as possible and are discharged into the coolant cycle only after having lost a considerable percentage of their radioactivity.

It is a particular advantage to use relief pressure valves with laminated metal disks arranged above each other under prestress, which are lifted off each other when a certain preset fission gas over-pressure has been reached, thus creating an outlet for the fission gases. They have the advantage of particular ruggedness, because they contain no mobile parts.

On the basis of FIGS. 5-7 this type of throttle is described hereafter.

It is practically made of a tube length 25 (FIG. 5) squeezed together at its free end 26 so as to be gastight and connected with the fuel element 28 at the other end. When the necessary fission gas over-pressure is reached, the squeezed tube areas of the free end 26 are lifted off each other causing fission gas to flow out of the fuel element 28. No coolant is able to flow back into the fuel element, because the squeezed portion is pressed together by prestressing and thus securely sealed.

For the outlet opening bores 27 may in addition be provided in the squeezed area of the tube end.

According to FIG. 6 it is possible to connect several of the throttles shown here in series in the discharging device in order to obtain one retention chamber 29 for fission gases after every throttle 30. It is also possible according to FIG. 7 to install a tube 31 squeezed in various places on a fuel element 32 where the fission gas after having flowed through a squeezed portion 33 flows into a new expansion 34 acting as a retention chamber and finally leaves the discharging device through the last squeezed portion.

In another particularly advantageous device for the execution of the process according to the invention the discharging device under the invention contains devices to throttle the flow of gas by means of a temporary or partial volume reduction of the fission gases.

This can for instance be done by installing in the discharging device in the flow path of the fission gases a reception chamber intensely cooled by the coolant to take up the fission gas. The boiling point of most fission gases is above 680° C. Following are the boiling points of the most common fission gases:

| | °C. |
|---|---|
| Cadmium | 765 |
| Cesium | 690 |
| Rubidium | 680 |
| Selenium | 680 |

Now, if the reception chamber is kept at temperatures below 680° C. by intense cooling or, at a higher fission gas pressure than 1 ata., also at a correspondingly higher temperature, all fission gases having higher boiling points are condensed with a considerable reduction in volume. As a consequence, the pressure of the fission gases in the fuel element will remain relatively low. The larger in this connection the reception chamber for the fission gases, the longer will be the average retention time of the fission gases in the reception chamber. It should at least be large enough, however, to take up the amount of fission gas in the liquid state, thus causing average retention periods of sixty days. After that time the activity of the fission gases has decayed far enough to be discharged into the coolant by way of familiar throttling and pressure relief valves. This type of fission gas condensation chamber (fission gas reception chamber) may be installed in any part of the fuel element, e.g. between the core and the blanket, but preferably on the colder side, i.e. on the coolant inlet side.

Details are described on the basis of FIGS. 8-10:

FIG. 8 shows a fission gas reception chamber 36 in a fuel rod 35 between the core region 37 and the blanket region 38 of the fuel rod 35. Towards the core region 37 the fission gas reception chamber 36 is closed by a filter 39 permeable to gas (laminated grid) so as to prevent fuel particles 40 carried along by the fission gas from entering the fission gas reception chamber 36. Most of the fission gases are condensed on the intensively cooled walls of the fission gas reception chamber 36. In the liquid state they only take up a small volume, thus enabling a relatively small chamber to hold large volumes of fission gas. Only fission gases having lower boiling points will then still flow through the fission gas condensation chamber without being condensed. In order to retain these fission gases also, one may arrange fission gas absorbing media in the fuel rod according to FIG. 9, e.g. behind the fission gas condensation chamber. Here, the absorption chamber 43 is separated from the fuel areas 41 and 42 by porous filters 44 and 45. The absorbents filled into the absorption chamber 43 may be sodium nitrates or sodium bicarbonates, for instance. These have the advantage of being solid at low temperatures and may thus be removed as solids with the absorbed fission gases when the fuel element is reprocessed. However, in reactor operation they are liquid so that it is easy to introduce the fission gas into them. In order to condense the absorbent quickly one may, according to FIG. 9, introduce the heat from the fuel areas 41 and 42 into the absorbent over a connecting rod 46 having good heat conduction.

However, as shown in FIG. 10, the absorbent may also be placed in a central channel 49 surrounded by fuel 50 so as to be heated up sufficiently strong. Here, porous filters 51 and 52 are installed between the fuel areas 47 and 48. The ring 53 in filter 52 is gastight to force the fission gas generated in the fuel 50 also to flow through the central channel 49 containing the absorbent.

However, the possibilities of executing the invention are not restricted to the examples described in the figures.

For instance, one may also arrange the absorption chamber in form of an annulus around a central fuel area. Moreover, in the examples of the execution described the chambers for retention of the fission gases are always shown above the fuel area because it was assumed that the coolant flow was directed downwards. One may also arrange the chambers below the fuel area, especially with the coolant flowing in the upward direction, and install guiding devices in the reception chamber and the absorption chamber to direct the fission gas into the chamber at the bottom, collect it again at the top and remove it in downward direction.

What is claimed is:

1. Device for removing fission gases from nuclear reactor fuel elements, comprising a fuel element in which fission gases develop; a fission-gas discharge device attached to said fuel element and having chamber means including an inlet and an outlet and through which the gases are adapted to flow in a path extending from said inlet to said outlet; and means for throttling the flow of such gases through said chamber means.

2. Device as claimed in claim 1, wherein said chamber means comprises a plurality of individual chambers connected in series, and wherein said means for throttling the flow of gases is arranged for throttling the flow of such gases through each of said individual chambers.

3. Device as claimed in claim 1, wherein said chamber means defines in the interior thereof a labyrinth system constituting said path in which said gases are adapted to flow.

4. Device as claimed in claim 1, and further comprising porous filtering media at least partly filling the interior of said chamber means.

5. Device as claimed in claim 4, wherein said filtering media are compacted.

6. Device as claimed in claim 5, wherein the compacted filtering media are sintered.

7. Device as claimed in claim 1, said chamber means comprising a wall at least a portion of which is gas permeable.

8. Device as claimed in claim 2, and comprising a plurality of walls separating consecutive ones of said chambers, each of said walls having at least a portion permeable to gas.

9. Device as claimed in claim 2, wherein a terminal one of said chambers comprises wall means separating said terminal chamber from the ambient atmosphere; at least a portion of said wall means being gas permeable and constituting said outlet so that gas can escape from said terminal chamber to the ambient atmosphere.

10. Device as claimed in claim 1, and further comprising filter means arranged intermediate said discharge device and said fuel element for separating from said fission gases condensable substances, including iodine, bromine, cesium and rubidium.

11. Device as claimed in claim 7, wherein said wall portion is composed essentially of compacted powdered material.

12. Device as claimed in claim 11, wherein said compacted powdered material is sintered.

13. Device as claimed in claim 1, wherein said throttling means arranged in said path of said fission gases comprises pressure relief valve means.

14. Device as claimed in claim 2, wherein said throttling means comprises a plurality of pressure-relief valves connecting said chambers with one another and each being adapted to open at a predetermined opening pressure, the sum of the opening pressures of said valves approximately corresponding to a predetermined permissible fission gas pressure in the fuel element.

15. Device as claimed in claim 13, wherein said pressure-relief valve means comprises a plurality consecutively arranged disposed in said path of said gases prestressed laminations arranged on top of each other.

16. Device as claimed in claim 13, wherein said pressure-relief valve means comprises at least one tubular member having a first end portion arranged for flow of said gases thereinto, and a second free end portion comprising a peripheral wall including a pair of mutually opposite wall portions inwardly deflected in prestressed relationship and inwardly deflected so that both sides of the respectively tubes are prestressed and in engagement with one another.

17. Device as claimed in claim 16, said tubular member comprising aperture means provided in said free end portions thereof.

18. Device as claimed in claim 13, wherein said pressure-relief valve means comprises a tube including a peripheral wall having a plurality of longitudinally spaced pairs of mutually opposite wall portions, said wall being inwardly deflected in the region of the respective pairs whereby said wall portions are in engagement with one another.

19. Device as claimed in claim 1, wherein said throttling means comprises means for at least temporarily or partially reducing the volume of the gases for thereby delaying the flow of the latter.

20. Device as claimed in claim 19, wherein said last-mentioned means comprises a receiving chamber for the gas, and cooling means for cooling the gas in said receiving chamber to a predetermined degree so as to thereby reduce the volume of the gas.

21. Device as claimed in claim 19, wherein said last-mentioned means comprises a plurality of absorption chambers; and further comprising normally solid absorbent materials which become liquid at the operating temperature of said fuel elements, provided in said absorption chambers for absorbing fission gases in the same.

22. Device as claimed in claim 19, wherein said last-mentioned means comprises absorption-chamber means containing a normally solid material adapted to liquefy at elevated temperatures; and further comprising a heat-conducting rod having an end adapted to be heated to such elevated temperatures and another end located in said absorption-chamber means and extending into the absorbent material for liquefying the same.

23. Device as claimed in claim 1, wherein said chamber means is a single chamber.

24. Device as claimed in claim 1, wherein discharge of the gases is delayed in multiples of ten days.

25. Device as claimed in claim 1, wherein discharge of the gases is delayed by sixty days.

26. A device as defined in claim 4, wherein said filtering media include aluminum oxide and magnesium oxide.

27. Device as defined in claim 7, wherein said compacted powdered material is aluminum oxide.

References Cited

UNITED STATES PATENTS

| | | | |
|---|---|---|---|
| 3,010,889 | 11/1961 | Fortescue et al. | 176—37 X |
| 3,041,134 | 6/1962 | Weeks | 176—37 X |
| 3,219,538 | 11/1965 | Glueckauf et al. | 176—37 |
| 2,894,893 | 7/1959 | Carney | 176—37 X |
| 3,022,238 | 2/1962 | Kolflat | 176—37 X |
| 3,200,041 | 8/1965 | Ralfe et al. | 176—19 |
| 3,238,105 | 3/1966 | McNelly | 176—79 X |
| 3,203,866 | 8/1965 | Lehmer et al. | 176—37 |

FOREIGN PATENTS 915,773  1/1963  Great Britain.

CARL D. QUARFORTH, *Primary Examiner.*

M. J. SCOLNICK, *Assistant Examiner.*